US012777302B2

(12) United States Patent
Zhang et al.

(10) Patent No.: US 12,777,302 B2
(45) Date of Patent: Oct. 27, 2026

(54) SOUND TRANSMISSION METHODS, APPARATUS, AND NONVOLATILE COMPUTER-READABLE STORAGE MEDIA

(71) Applicant: Beijing Zitiao Network Technology Co., Ltd., Beijing (CN)

(72) Inventors: Zhengpu Zhang, Beijing (CN); Chuanzeng Huang, Beijing (CN); Junjie Shi, Beijing (CN); Xuzhou Ye, Beijing (CN); Derong Liu, Beijing (CN); Shilei Liu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 169 days.

(21) Appl. No.: 18/920,822

(22) Filed: Oct. 18, 2024

(65) Prior Publication Data

US 2025/0048052 A1 Feb. 6, 2025

Related U.S. Application Data

(63) Continuation of application No. PCT/CN2023/088854, filed on Apr. 18, 2023.

(30) Foreign Application Priority Data

Apr. 18, 2023 (WO) ................ PCT/CN2023/088854

(51) Int. Cl.
*H04S 7/00* (2006.01)

(52) U.S. Cl.
CPC ............. *H04S 7/302* (2013.01); *H04S 7/305* (2013.01); *H04S 2400/11* (2013.01)

(58) Field of Classification Search
CPC ...... H04S 7/302; H04S 7/305; H04S 2400/11; H04S 7/00; G01H 17/00; H04R 3/04; G10K 15/08; G10K 15/12
(Continued)

(56) References Cited

U.S. PATENT DOCUMENTS 11,170,139 B1 * 11/2021 Schroeder ............... G06F 30/20
11,172,320 B1 * 11/2021 Pelzer ..................... G06T 15/06
(Continued)

FOREIGN PATENT DOCUMENTS

CN 102589676 A 7/2012
CN 111158459 A 5/2020
(Continued)

OTHER PUBLICATIONS

International Search Report and Written Opinion for PCT/CN2023/088854, mailed on Jul. 23, 2023, 15 pages.

*Primary Examiner* — Xu Mei
(74) *Attorney, Agent, or Firm* — Astute IP Law Group

(57) ABSTRACT

A sound transmission method. The sound transmission method includes: according to a plurality of rays emitted to the periphery with an sound source as a center, determining an intersection point set of the plurality of rays and a wall of a building; estimating an sound transmission model of the building according to the intersection point set; and, by means of the sound transmission model, estimating a transmission condition in the wall of the sound emitted by the acoustic source. Also disclosed are a sound transmission apparatus, a non-volatile computer-readable storage medium, a computer program, and a computer program product.

14 Claims, 5 Drawing Sheets

(58) Field of Classification Search
USPC .................................................... 381/63, 303
See application file for complete search history.

(56) References Cited

U.S. PATENT DOCUMENTS

| | | | | |
|---|---|---|---|---|
| 2018/0232471 | A1* | 8/2018 | Schissler ............. | G06F 18/2413 |
| 2020/0037091 | A1 | 1/2020 | Jeon et al. | |
| 2020/0142665 | A1 | 5/2020 | Dantrey et al. | |
| 2020/0293273 | A1* | 9/2020 | Dantrey .................. | G06F 3/165 |
| 2020/0374648 | A1* | 11/2020 | Robinson ................ | H04S 3/008 |
| 2022/0303715 | A1* | 9/2022 | Watanabe ............... | H04S 7/305 |

FOREIGN PATENT DOCUMENTS

| | | | |
|---|---|---|---|
| CN | 112205006 | A | 1/2021 |
| CN | 113327321 | A | 8/2021 |
| JP | 2004-077352 | A | 3/2004 |
| JP | 2006078322 | A | 3/2006 |
| TW | I640983 | B | 11/2018 |

* cited by examiner

SOUND TRANSMISSION METHODS, APPARATUS, AND NONVOLATILE COMPUTER-READABLE STORAGE MEDIA

CROSS-REFERENCE TO RELATED APPLICATIONS

This application is a continuation of International Patent Application No. PCT/CN2023/088854, filed on Apr. 18, 2023, which is based on and claims priority of PCT/CN2022/087680, filed on Apr. 19, 2022, the disclosures of which are hereby incorporated into this disclosure by reference in their entireties.

TECHNICAL FIELD

This disclosure relates to the technical field of audio processing, particularly to a sound transmission method and apparatus, and a non-volatile computer-readable storage medium.

BACKGROUND

Sound can propagate not only through air, but also through objects. The ability of sound to penetrate is different for different objects. When sound travels through air and hits an object, phenomena such as reflection, diffraction and transmission may occur.

The essence of sound transmission is that sound can propagate through media and has the function of refraction. Sound can propagate in different media, the most common of which is air (which is also a medium). In addition, the speed of sound propagation is different in different media. At standard atmospheric pressure, the propagation speed of sound in air is 340 m/s, in water 1500 m/s and in steel 5200 m/s. The listening tube experiment shown in FIG. 1 is an intuitive experiment in auditory perception of sound propagation.

When sound waves propagate from one medium to another, there is a change in the direction of sound propagation. Some sound waves are refracted. The refraction of sound waves is most noticeable when they pass through media with gradually changing properties. The refraction of sound waves is also affected by the different propagation speeds $v_1$ and $v_2$ of sound in different media, and the refraction of sound waves is related to the angle of incidence $\theta_1$ of sound entering a medium, as shown in FIG. 2:

$$\frac{v_1}{\sin\theta_1} = \frac{v_2}{\sin\theta_2}$$

In complex real-world environments, due to the complexity of buildings or virtual scenes, which may consist of various media with different transmission coefficients, refractive indices, etc., very complex transmission phenomena may occur. FIG. 3 shows a simplified sound propagation simulation for sound transmission.

As shown in FIG. 3, there is a wall obstructing a sound emitting device from a listener, which prevents the sound from reaching the listener directly. The sound waves emitted from the sound emitting device may pass through the obstructing wall and reach the listener; in addition, the sound may also reach the wall, propagate within the wall, and then reach the listener; or the sound may be reflected and then transmitted to the listener.

In order to accurately simulate these acoustic characteristics in environmental acoustic simulation, it is necessary to model the phenomena and nature of sound to achieve accurate simulation of acoustic phenomena.

SUMMARY

According to some embodiments of the present disclosure, there is provided a sound transmission method, comprising: determining, based on a plurality of rays emitted in various directions from a sound source, a set of intersection points between the plurality of rays and a wall of a building; estimating a sound transmission model of the building based on the set of intersection points; and estimating a transmission condition in the wall for a sound emitted by the sound source using the sound transmission model.

In some embodiments, the set of intersection points comprises an intersection point between a direct sound ray and an environmental obstacle in the building, and the sound transmission method further comprises: determining whether there is a direct sound ray in the building through a sound ray tracing; determining that the direct sound ray is obstructed by an environmental obstacle, in response to there being not the direct sound ray; and calculating an intersection point between the direct sound ray and the environmental obstacle.

In some embodiments, the determining whether there is the direct sound ray comprises: determining whether the direct sound ray emitted from the sound source is able to be received at a position where a listener is located in the building.

In some embodiments, the estimating the sound transmission model of the building based on the set of intersection points comprises: estimating a center, a length, a width, and a height of the sound transmission model based on the set of intersection points.

In some embodiments, the estimating the sound transmission condition in the wall for the sound emitted from the sound source using the sound transmission model comprises: determining, according to the sound transmission model, position information of the sound source in the sound transmission model, and position information of a listener in the sound transmission model, a direct-transmission wall and a side-projection wall in the sound transmission model based on directions of the plurality of rays; calculating, for the sound source, a set of intersection points on a side plane in the sound transmission model based on the sound transmission model and a direction of the sound source; and performing a 3D spatial audio calculation based on the set of intersection points.

In some embodiments, the direct-transmission wall comprises a wall of an environmental obstacle in the sound transmission model, and the side-projection wall comprises a wall other than the environmental obstacle in the sound transmission model; the side plane comprises the direct-transmission wall and the side-projection wall; the direction of the sound source comprises a direction of a ray from the sound source to the listener; and an intersection point in the set of intersection points is determined based on an intersection point between a ray emitted from the sound source and the side plane, and an intersection point between the direct sound ray emitted from the sound source and the direct-transmission wall.

In some embodiments, the performing the 3D spatial audio calculation based on the set of intersection points comprises: calculating a qualified transmission point in the set of intersection points based on a dot product of a vector formed by the sound source and an intersection point in the set of intersection points and a vector formed by the sound source and the listener; and performing the 3D spatial audio calculation based on the qualified transmission point.

In some embodiments, the performing 3D spatial audio calculation based on the qualified transmission point comprises: calculating a total spatial impulse response set based on the qualified transmission point; and performing the 3D spatial audio calculation based on the total spatial impulse response set.

In some embodiments, the vector formed by the sound source and the listener is a first vector, and the vector formed by the sound source and the intersection point in the set of intersection points is a second vector, wherein the calculating the qualified transmission point in set of intersection points comprises: determining an intersection point corresponding to the second vector whose dot product with the first vector is greater than 0 as the qualified transmission point. In some embodiments, the spatial impulse response set comprises an intersection point between the side-projection wall and a ray reaching the listener through a reflection at the side-projection wall.

In some embodiments, the calculating the total spatial impulse response set comprises: calculating a spatial impulse response set for a sound transmission based on the qualified transmission point; and determining the total spatial impulse response set based on the spatial impulse response set for the sound transmission and a spatial impulse response set for a sound reflection.

In some embodiments, the performing the 3D spatial audio calculation based on the set of intersection points comprises: simulating a sound received by the listener through the 3D spatial audio calculation.

In some embodiments, the simulating the sound received by the listener through the 3D spatial audio calculation comprises: generating, for a sound corresponding to a ray emitted from the sound source, a propagation path to the listener based on an intersection line between a plurality of transmission walls of the building and an intersection point between the ray emitted from the sound source and any one of the plurality of transmission walls, wherein the plurality of transmission walls comprise the direct-transmission wall and the side-projection wall; and simulating the sound ray received by the listener based on the propagation path.

According to other embodiments of the present disclosure, there is provided a sound transmission apparatus, comprising: a determination unit configured to determine, based on a plurality of rays emitted in various directions from a sound source, a set of intersection points between the plurality of rays and a wall of a building; and an estimation unit configured to estimate a sound transmission model of the building based on the set of intersection points and estimate a transmission condition in the wall for a sound emitted by the sound source using the sound transmission model.

In some embodiments, the sound transmission apparatus further comprises: a judgment unit configured to determine whether there is a direct sound ray in the building through a sound ray tracing; and the determination unit is further configured to determine that the direct sound ray is obstructed by an environmental obstacle, in response to there being not the direct sound ray, and calculate an intersection point between the direct sound ray and the environmental obstacle, wherein the set of intersection points comprises an intersection point between a direct sound ray and an environmental obstacle in the building.

In some embodiments, the estimation unit estimates a center, a length, a width, and a height of the sound transmission model based on the set of intersection points.

In some embodiments, the estimation unit is configured to determine, according to the sound transmission model, position information of the sound source in the sound transmission model, and position information of a listener in the sound transmission model, a direct-transmission wall and a side-projection wall in the sound transmission model based on directions of the plurality of rays, calculate, for the sound source, a set of intersection points on a side plane in the sound transmission model based on the sound transmission model and a direction of the sound source, and perform a 3D spatial audio calculation based on the set of intersection points.

In some embodiments, the estimation unit is configured to calculate a qualified transmission point in the set of intersection points based on a dot product of a vector formed by the sound source and an intersection point in the set of intersection points and a vector formed by the sound source and the listener, and perform the 3D spatial audio calculation based on the qualified transmission point.

In some embodiments, the estimation unit is configured to calculate a total spatial impulse response set based on the qualified transmission point, and perform the 3D spatial audio calculation based on the total spatial impulse response set.

According to still other embodiments of the present disclosure, there is provided a sound transmission apparatus, comprising: a memory; a processor coupled to the memory, the processor configured to, based on instructions stored in the memory, perform the sound transmission method according to any one of the above embodiments.

According to still other embodiments of the present disclosure, there is provided a non-volatile computer readable storage medium having stored thereon a computer instruction that, when executed by a processor, implements the sound transmission method according to any one of the above embodiments.

According to some embodiments of the present disclosure, there is further provided a computer program, comprising: instructions that, when executed by a processor, cause the processor to implement the sound transmission method according to any one of the above embodiments.

According to some embodiments of the present disclosure, there is further provided a computer program product comprising instructions that, when executed by a processor, cause the processor to implement the sound transmission method according to any one of the above embodiments.

Other features and advantages of the present disclosure will become apparent from the following detailed description of exemplary embodiments of the present disclosure with reference to the accompanying drawings.

BRIEF DESCRIPTION OF THE DRAWINGS

The accompanying drawings, which are comprised to provide a further understanding of the present disclosure and are incorporated in and constitute a part of this specification, illustrate embodiments of the present disclosure, and together with the description thereof serve to explain the present disclosure, but are not limitation thereof. In the drawings.

DETAILED DESCRIPTION

Figure 1:
FIG. 1 shows a schematic diagram of a listening tube experiment.
Figure 2:
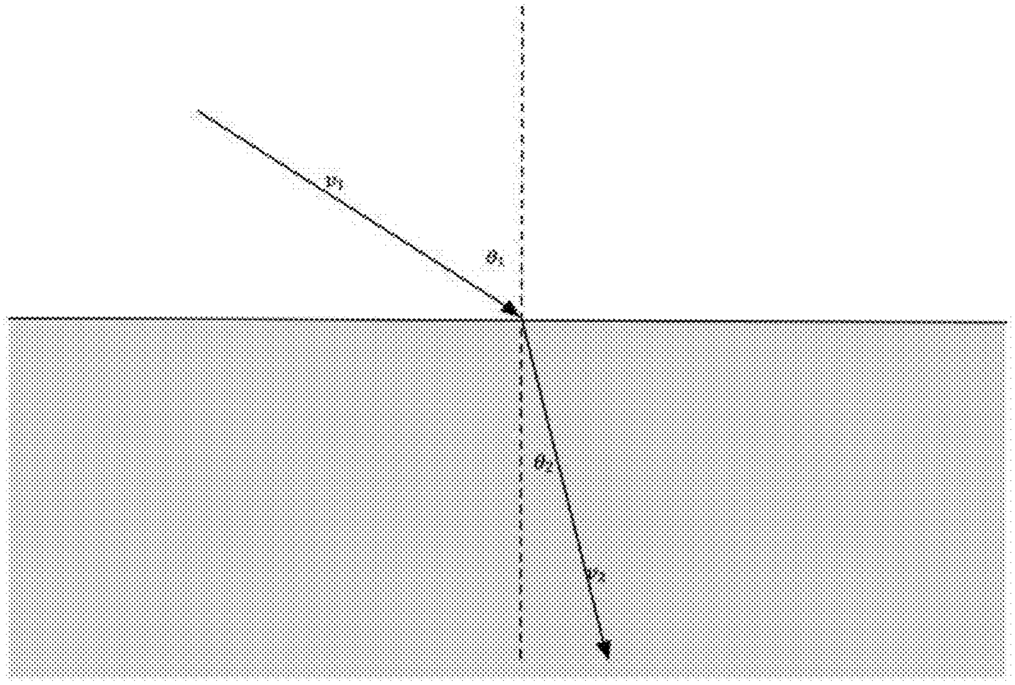
FIG. 2 shows a schematic diagram of sound wave refraction.
Figure 3:
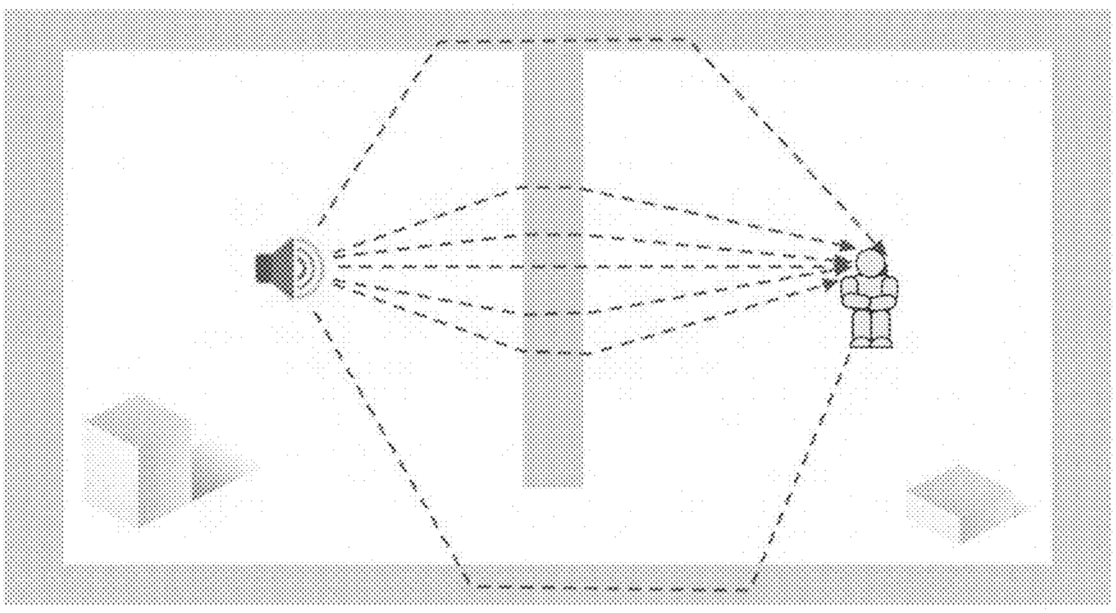
FIG. 3 shows a schematic diagram of a transmitted sound propagation simulation.

Below, a clear and complete description will be given for the technical solution of embodiments of the present disclosure with reference to the figures of the embodiments. Obviously, merely some embodiments of the present disclosure, rather than all embodiments thereof, are given herein. The following description of at least one exemplary embodiment is in fact merely illustrative and is in no way intended as a limitation to the disclosure, its application or use. All other embodiments obtained by persons of ordinary skill in the art based on the embodiments of the present disclosure without creative efforts shall fall within the protection scope of the present disclosure.

Unless otherwise specified, the relative arrangement, numerical expressions and values of the components and steps set forth in these embodiments do not limit the scope of the disclosure. At the same time, it should be understood that, for ease of description, the dimensions of the various parts shown in the drawings are not drawn to actual proportions. Techniques, methods, and apparatus known to those of ordinary skill in the relevant art may not be discussed in detail, but where appropriate, these techniques, methods, and apparatuses should be considered as part of the specification. Of all the examples shown and discussed herein, any specific value should be construed as merely illustrative and not as a limitation. Thus, other examples of exemplary embodiments may have different values. Notice that similar reference numerals and letters are denoted by the like in the accompanying drawings, and therefore, once an item is defined in a drawing, there is no need for further discussion in the accompanying drawings.

In environmental acoustic simulation, sound transmission phenomena are affected by various factors such as sound pressure level, environmental building materials, thickness, and room geometry, etc. The accurate simulation of sound transmission is a complex and difficult technical problem. In industry, more research is focused on how materials and geometric design affect sound transmission. Environmental acoustic simulation mainly simulates the transmission phenomena of direct sound rays, and it is difficult to comprehensively simulate the propagation and refraction of sound in objects (different materials and geometric shapes of buildings have different effects on sound transmission).

In this disclosure, point cloud of intersection points is formed through sound ray tracing using the intersection points between sound rays and object surfaces to reconstruct a regular geometric building via the point cloud. Then, based on the transmission and refraction characteristics of sound and the transmission coefficients of the building, the process of sound propagation and transmission in objects is simulated.

Figure 4A:
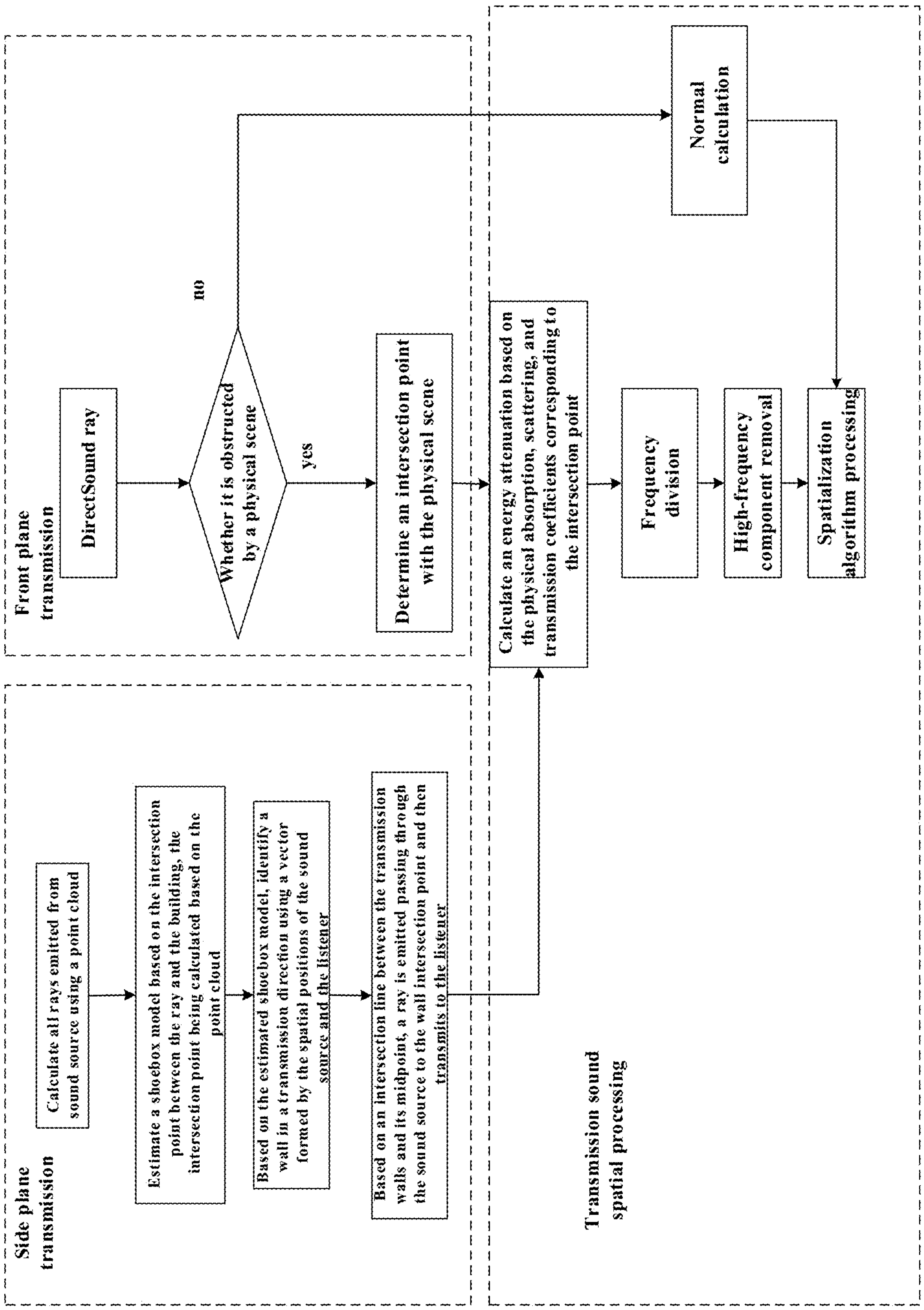
FIG. 4*a* shows a flowchart of a sound transmission method according to some embodiments of the present disclosure.

FIG. 4*a* shows a flowchart of a sound transmission method according to some embodiments of the present disclosure.

As shown in FIG. 4*a*, sound ray tracing is used to determine whether a direct sound ray (DirectSound Ray) emitted by a sound source is present at a listener's location; If not, it is determined that the direct sound ray is obstructed by an obstacle in the physical scene, and an intersection point $i_{direct}$ between the direct sound ray and the obstacle is calculated.

With the sound source as the center, N rays are emitted in various directions, and a set of intersection points $I=\{i_0, i_1, \ldots, i_k, i_M\}$ is determined for these rays.

The center $\{x_{center}, y_{center}, z_{center}\}$, length L, width W, and height H of an AABB model are estimated based on this set of intersection points. For example, the AABB model may be a shoebox model.

Based on the AABB model and position information of the sound source and the listener, as well as the direction of each ray, a direct-transmission wall $f_{face}$ and a ide-projection walls $f_{side}$ are identified.

A set of intersection points between the rays and each side plane are calculated using the following equation based on the AABB model and a direction of the sound source:

$$\begin{cases} H_{side} = \{p_0, p_1, \cdots, p_4\} \\ H = H_{side} \cup i_{direct} \end{cases}$$

According to the dot product of a vector formed by the sound source and a wall intersection point in the set of intersection points and a vector formed by the sound source and the listener, a qualified point is determined as the transmission point using the following equation:

$$H' = H\left\{p_i, \vec{pl} \cdot \vec{sl} > 0\right\}$$

$\vec{pl}$, $\vec{sl}$ respectively represent a vector formed by the sound source and the listener, and a vector formed by the sound source and an intersection point; and H' is a set of qualified transmission points. For example, if the vector formed by the sound source and the listener is a first vector, and the vector formed by the sound source and an intersection point in the set of intersection points is a second vector, an intersection point corresponding to a second vector whose dot product with the first vector is greater than 0 is determined as the a qualified transmission point.

By means of these qualified transmission points, a spatial impulse response set $R_{H'}$ is calculated for the transmissions from the sound source to the transmission point and then to the listener, which is then added into a total spatial impulse responses:

$$R = R_r \cup R_{H'}$$

$R_r$ is a spatial impulse response set for sound reflection, $R_{H'}$ is a spatial impulse response set for sound transmission, and R is a total spatial impulse response set. For example, the spatial impulse response set for sound reflection comprises the intersection point between the side-projection wall and the ray reaching the listener by reflection from the side-projection wall.

3D spatial audio calculation is performed based on the response set.

In some embodiments, based on a plurality of rays emitted by a sound source in various directions, a set of intersection points between the plurality of rays and a wall of a building is determined; a sound transmission model is estimated for the building based on the set of intersection points.

For example, in the case of side plane transmission, where the sound ray emitted by the sound source is transmitted to the listener via the side-projection wall, as shown in FIG. 4*a*, the point cloud is used to calculate the intersection points of all the rays emitted by the sound source with each wall; a shoebox model is estimated based on the intersection points between the rays and the building, the intersection points being calculated based on the point cloud; based on the estimated shoebox model, a wall in a transmission direction can be identified using a vector formed by the spatial positions of the sound source and the listener; based on each intersection line between the transmission walls and a point on the line (such as the midpoint), a ray is emitted that passes through the sound source to the wall intersection point and then transmits to the listener.

For example, based on the intersection lines between the plurality of transmission walls and an intersection point of the ray emitted from the sound source with any one of the transmission walls, a propagation path to the listener is generated for a sound ray corresponding to the ray emitted from the sound source. The transmission walls comprise a direct-transmission wall and a side-projection wall; a sound ray received by the listener is simulated based on the propagation path.

In some embodiments, whether there is a direct sound ray in a building is determined through sound ray tracing. For example, it is determined whether a direct sound ray emitted from the sound source can be received at a listener's position in the building.

In some embodiments, if no direct sound ray is received, it is determined that the direct sound ray is obstructed by an environmental obstacle in the building; and an intersection point of the direct sound ray with the environmental obstacle is calculated. For example, a set of intersection points may comprise the intersection point of the direct sound ray with the environmental obstacle.

For example, as shown in FIG. 4*a*, in the case of front plane transmission, that is, a sound ray emitted from the sound source is transmitted through a direct-transmission wall to the listener, it is determined whether the direct sound ray is obstructed by a physical scene (environmental obstacle) in the building; if the direct sound ray is obstructed, an intersection point between a ray corresponding to the direct sound ray and the physical scene is determined; if the direct sound ray is not obstructed, a spatialization algorithm is used for processing.

In some embodiments, based on a sound transmission model, position information of the sound source in the sound transmission model, and position information of the listener in the sound transmission model, a direct-transmission wall and a side-projection wall in the sound transmission model are determined based on directions of the plurality of rays; a set of intersection points at a side plane in the sound transmission model are calculated for the sound source based on the sound transmission model and a sound source direction; 3D spatial audio calculation is performed based on the set of intersection points.

For example, the direct-transmission wall comprises a wall of an environmental obstacle in the sound transmission model, and the side-projection wall comprises a wall other than the environmental obstacle in the sound transmission model; the side plane comprises the direct-transmission wall and the side-projection wall; the sound source direction comprises a direction of a ray from the sound source to the listener; the intersection point in the set of intersection points is determined based on the intersection point between a ray from the sound source to the listener and the side plane, as well as the intersection point between a direct sound ray emitted from the sound source and the direct-transmission wall.

In some embodiments, a transmission condition in a wall is estimated for a sound emitted from the sound source using the sound transmission model. The sound received by the listener is simulated through the 3D spatial audio calculation.

For example, as shown in FIG. 4*a*, a transmission sound spatial processing is performed based on a ray and an intersection point determined in a side plane transmission and a front plane transmission to simulate the sound heard by the listener. An energy attenuation calculation is performed based on the physical absorption, scattering, and a transmission coefficient corresponding to an intersection point, and then a frequency division processing, a high-frequency component removal processing, and a spatialization processing are processed.

This disclosure provides an estimation of a sound transmission model: a sound ray tracing and a shoebox model estimation; and provides to estimate sound transmission in a wall using the shoebox model; and provides a total sound transmission model framework.

In this disclosure, a complex spatial geometric building is reconstructed through a sound ray tracing; sound transmission is then modeled using the shoebox geometric model to simulate a direct transmission sound ray, a transmission and a refraction sound ray in a wall and a geometric object in a sound transmission.

This enables high-fidelity simulation of sound transmission phenomena in environmental acoustics. It also effectively solves the technical problem of simulating complex environmental sound transmission effects in application scenarios such as games and music playing.

Figure 4B:
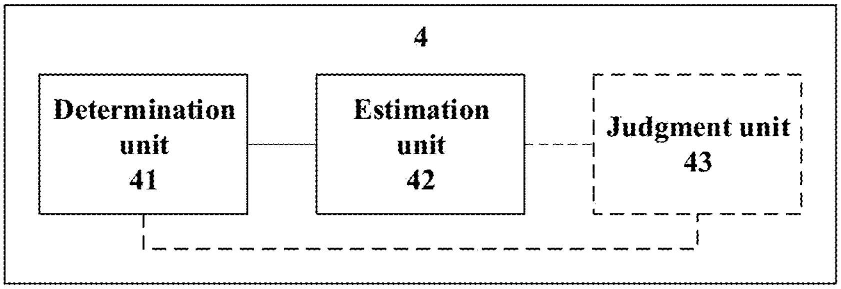
FIG. 4*b* shows a block diagram of a sound transmission apparatus according to some embodiments of the present disclosure.

FIG. 4*b* shows a block diagram of a sound transmission apparatus according to some embodiments of the present disclosure.

As shown in FIG. 4*b*, the sound transmission apparatus 4 comprises: a determination unit 41 configured to determine, based on a plurality of rays emitted in various directions from a sound source, a set of intersection points between the plurality of rays and a wall of a building; and an estimation unit 42 configured to estimate a sound transmission model of the building based on the set of intersection points and estimate a transmission condition in the wall for a sound emitted by the sound source using the sound transmission model.

In some embodiments, the sound transmission apparatus 4 further comprises: a judgment unit 43 configured to determine whether there is a direct sound ray in the building through a sound ray tracing; and the determination unit 41 is further configured to determine that the direct sound ray is obstructed by an environmental obstacle, in response to there being not the direct sound ray, and calculate an intersection point between the direct sound ray and the environmental obstacle, wherein the set of intersection points comprises an intersection point between a direct sound ray and an environmental obstacle in the building.

For example, the judgment unit 43 determines whether the direct sound ray emitted from the sound source is able to be received at a position where a listener is located in the building.

In some embodiments, the estimation unit 42 estimates a center, a length, a width, and a height of the sound transmission model based on the set of intersection points.

In some embodiments, the estimation unit 42 is configured to determine, according to the sound transmission model, position information of the sound source in the sound transmission model, and position information of a listener in the sound transmission model, a direct-transmission wall and a side-projection wall in the sound transmission model based on directions of the plurality of rays; calculate, for the sound source, a set of intersection points on a side plane in the sound transmission model based on the sound transmission model and a direction of the sound source; and perform a 3D spatial audio calculation based on the set of intersection points.

For example, the direct-transmission wall comprises a wall of an environmental obstacle in the sound transmission model, and the side-projection wall comprises a wall other than the environmental obstacle in the sound transmission model; the side plane comprises the direct-transmission wall and the side-projection wall; the direction of the sound source comprises a direction of a ray from the sound source to the listener; and an intersection point in the set of intersection points is determined based on an intersection point between a ray emitted from the sound source and the side plane, and an intersection point between the direct sound ray emitted from the sound source and the direct-transmission wall.

In some embodiments, the estimation unit 42 is configured to calculating a qualified transmission point in the set of intersection points based on a dot product of a vector formed by the sound source and an intersection point in the set of intersection points and a vector formed by the sound source and the listener; and performing the 3D spatial audio calculation based on the qualified transmission point.

For example, the vector formed by the sound source and the listener is a first vector, and the vector formed by the sound source and the intersection point in the set of intersection points is a second vector, the estimation unit 42 determines an intersection point corresponding to the second vector whose dot product with the first vector is greater than 0 as the qualified transmission point.

In some embodiments, the estimation unit 42 is configured to calculate a total spatial impulse response set based on the qualified transmission point; and perform the 3D spatial audio calculation based on the total spatial impulse response set.

For example, the spatial impulse response set comprises an intersection point between the side-projection wall and a ray reaching the listener through a reflection at the side-projection wall.

In some embodiments, the estimation unit 42 simulates a sound received by the listener through the 3D spatial audio calculation.

In some embodiments, the estimation unit 42 is configured to generate, for a sound corresponding to a ray emitted from the sound source, a propagation path to the listener based on an intersection line between a plurality of transmission walls of the building and an intersection point between the ray emitted from the sound source and any one of the plurality of transmission walls, wherein the plurality of transmission walls comprise the direct-transmission wall and the side-projection wall; and simulate the sound ray received by the listener based on the propagation path.

Figure 5:
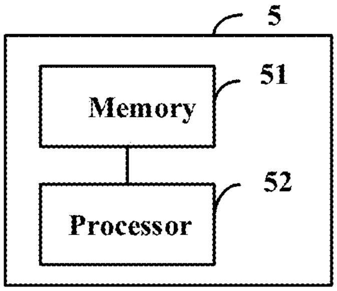
FIG. 5 shows a block diagram of a sound transmission apparatus according to other embodiments of the present disclosure.

FIG. 5 shows a block diagram of a sound transmission apparatus according to other embodiments of the present disclosure.

As shown in FIG. 5, the sound transmission apparatus 5 of this embodiment comprises: a memory 51 and a processor 52 coupled to the memory 51, the processor 52 configured to, based on instructions stored in the memory 51, carry out the sound transmission method according to any one of the embodiments of the present disclosure.

The memory 51 may comprise, for example, a system memory, a fixed non-volatile storage medium, or the like. The system memory stores, for example, an operating system, applications, a boot loader, a database, and other programs.

Figure 6:
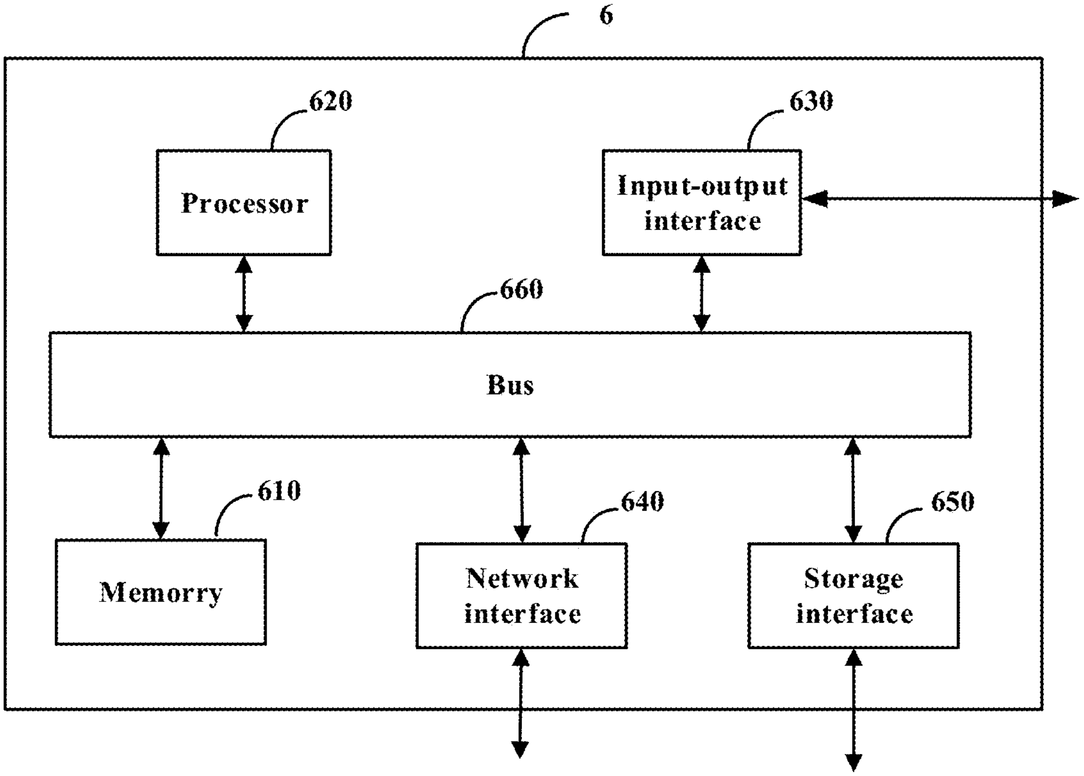
FIG. 6 shows a block diagram of a sound transmission apparatus according to still other embodiments of the present disclosure.

FIG. 6 shows a block diagram of a sound transmission apparatus according to still other embodiments of the present disclosure.

As shown in FIG. 6, the sound transmission apparatus 6 of this embodiment comprises: a memory 610 and a processor 620 coupled to the memory 610, the processor 620 configured to, based on instructions stored in the memory 610, carry out the sound transmission method according to any one of the foregoing embodiments.

The memory 610 may comprise, for example, a system memory, a fixed non-volatile storage medium, or the like. The system memory stores, for example, an operating system, application programs, a boot loader, and other programs.

The sound transmission apparatus 6 may further comprise an input-output interface 630, a network interface 640, a storage interface 650, and the like. These interfaces 630, 640, 650, the memory 610 and the processor 620 may be connected through a bus 660, for example. Wherein, the input-output interface 630 provides a connection interface for input-output devices such as a display, a mouse, a keyboard, a touch screen, a microphone, a loudspeaker, etc. The network interface 640 provides a connection interface for various networked devices. The storage interface 650 provides a connection interface for external storage devices such as an SD card and a USB flash disk.

According to further embodiments of the present disclosure, there is provided a computer program, comprising: instructions that, when executed by a processor, cause the processor to implement the sound transmission method according to any one of the above embodiments.

According to some embodiments of the present disclosure, there is further provided a computer program product comprising instructions that, when executed by a processor, cause the processor to implement the sound transmission method according to any one of the above embodiments.

Those skilled in the art should understand that the embodiments of the present disclosure may be provided as a method, a system, or a computer program product. Therefore, embodiments of the present disclosure can take the form of an entirely hardware embodiment, an entirely software embodiment or an embodiment containing both hardware and software elements. Moreover, the present disclosure may take the form of a computer program product embodied on one or more computer-usable non-transitory storage media (comprising but not limited to disk storage, CD-ROM, optical storage device, etc.) having computer-usable program code embodied therein.

Heretofore, the present disclosure has been described in detail. In order to avoid obscuring the concepts of the present disclosure, some details known in the art are not described. Based on the above description, those skilled in the art can understand how to implement the technical solutions disclosed herein.

The method and system of the present disclosure may be implemented in many ways. For example, the method and system of the present disclosure may be implemented by software, hardware, firmware, or any combination of software, hardware, and firmware. The above sequence of steps of the method is merely for the purpose of illustration, and the steps of the method of the present disclosure are not limited to the above-described specific order unless otherwise specified. In addition, in some embodiments, the present disclosure may also be implemented as programs recorded in a recording medium, which comprise machine-readable instructions for implementing the method according to the present disclosure. Thus, the present disclosure also covers a recording medium storing programs for executing the method according to the present disclosure.

Although some specific embodiments of the present disclosure have been described in detail by way of example, those skilled in the art should understand that the above examples are only for the purpose of illustration and are not intended to limit the scope of the present disclosure. It should be understood by those skilled in the art that the above embodiments may be modified without departing from the scope and spirit of the present disclosure. The scope of the disclosure is defined by the following claims.

What is claimed is:

1. A sound transmission method, comprising:

determining, based on a plurality of rays emitted in various directions from a sound source, a set of intersection points between the plurality of rays and a wall of a building;

estimating a sound transmission model of the building based on the set of intersection points; and estimating a transmission condition in the wall for a sound emitted by the sound source using the sound transmission model.

2. The sound transmission method according to claim 1, wherein the set of intersection points comprises an intersection point between a direct sound ray and an environmental obstacle in the building, wherein the sound transmission method further comprises:

determining whether there is a direct sound ray in the building through a sound ray tracing;

determining that the direct sound ray is obstructed by an environmental obstacle, in response to there being not the direct sound ray; and calculating an intersection point between the direct sound ray and the environmental obstacle.

3. The sound transmission method according to claim 2, wherein the determining whether there is the direct sound ray comprises:

determining whether the direct sound ray emitted from the sound source is able to be received at a position where a listener is located in the building.

4. The sound transmission method according to claim 1, wherein the estimating the sound transmission model of the building based on the set of intersection points comprises:

estimating a center, a length, a width, and a height of the sound transmission model based on the set of intersection points.

5. The sound transmission method according to claim 1, wherein the estimating the sound transmission condition in the wall for the sound emitted from the sound source using the sound transmission model comprises:

determining, according to the sound transmission model, position information of the sound source in the sound transmission model, and position information of a listener in the sound transmission model, a direct-transmission wall and a side-projection wall in the sound transmission model based on directions of the plurality of rays;

calculating, for the sound source, a set of intersection points on a side plane in the sound transmission model based on the sound transmission model and a direction of the sound source; and performing a 3D spatial audio calculation based on the set of intersection points.

6. The sound transmission method according to claim 5, wherein:

the direct-transmission wall comprises a wall of an environmental obstacle in the sound transmission model, and the side-projection wall comprises a wall other than the environmental obstacle in the sound transmission model;

the side plane comprises the direct-transmission wall and the side-projection wall;

the direction of the sound source comprises a direction of a ray from the sound source to the listener; and an intersection point in the set of intersection points is determined based on an intersection point between a ray emitted from the sound source and the side plane, and an intersection point between the direct sound ray emitted from the sound source and the direct-transmission wall.

7. The sound transmission method according to claim 5, wherein the performing the 3D spatial audio calculation based on the set of intersection points comprises:

calculating a qualified transmission point in the set of intersection points based on a dot product of a vector formed by the sound source and an intersection point in the set of intersection points and a vector formed by the sound source and the listener; and performing the 3D spatial audio calculation based on the qualified transmission point.

8. The sound transmission method according to claim 7, wherein the performing 3D spatial audio calculation based on the qualified transmission point comprises:

calculating a total spatial impulse response set based on the qualified transmission point; and performing the 3D spatial audio calculation based on the total spatial impulse response set.

9. The sound transmission method according to claim 7, wherein the vector formed by the sound source and the listener is a first vector, and the vector formed by the sound source and the intersection point in the set of intersection points is a second vector, wherein the calculating the qualified transmission point in set of intersection points comprises:

determining an intersection point corresponding to the second vector whose dot product with the first vector is greater than 0 as the qualified transmission point.

10. The sound transmission method according to claim 8, wherein the calculating the total spatial impulse response set comprises:

calculating a spatial impulse response set for a sound transmission based on the qualified transmission point; and determining the total spatial impulse response set based on the spatial impulse response set for the sound transmission and a spatial impulse response set for a sound reflection.

11. The sound transmission method according to claim 5, wherein the performing the 3D spatial audio calculation based on the set of intersection points comprises:

simulating a sound received by the listener through the 3D spatial audio calculation.

12. The sound transmission method according to claim 11, wherein the simulating the sound received by the listener through the 3D spatial audio calculation comprises:

generating, for a sound corresponding to a ray emitted from the sound source, a propagation path to the listener based on an intersection line between a plurality of transmission walls of the building and an intersection point between the ray emitted from the sound source and any one of the plurality of transmission walls, wherein the plurality of transmission walls comprise the direct-transmission wall and the side-projection wall; and simulating the sound ray received by the listener based on the propagation path.

13. A sound transmission apparatus, comprising:

a memory; and a processor coupled to the memory, the processor configured to, based on instructions stored in the memory, carry out a sound transmission method, comprising:

determining, based on a plurality of rays emitted in various directions from a sound source, a set of intersection points between the plurality of rays and a wall of a building;

estimating a sound transmission model of the building based on the set of intersection points; and estimating a transmission condition in the wall for a sound emitted by the sound source using the sound transmission model.

14. A non-volatile computer-readable storage medium stored thereon a computer instruction that, when executed by a processor, implements a sound transmission method, comprising:

determining, based on a plurality of rays emitted in various directions from a sound source, a set of intersection points between the plurality of rays and a wall of a building;

estimating a sound transmission model of the building based on the set of intersection points; and estimating a transmission condition in the wall for a sound emitted by the sound source using the sound transmission model.

* * * * *